United States Patent
Ochi et al.

(10) Patent No.: US 8,875,492 B2
(45) Date of Patent: Nov. 4, 2014

(54) EXHAUST PIPE INJECTION CONTROL DEVICE

(75) Inventors: Naofumi Ochi, Fujisawa (JP); Tetsuya Murata, Fujisawa (JP); Takao Onodera, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 4 days.

(21) Appl. No.: 13/703,219

(22) PCT Filed: Jun. 10, 2011

(86) PCT No.: PCT/JP2011/063321
§ 371 (c)(1),
(2), (4) Date: Dec. 10, 2012

(87) PCT Pub. No.: WO2011/155586
PCT Pub. Date: Dec. 15, 2011

(65) Prior Publication Data
US 2013/0081379 A1    Apr. 4, 2013

(30) Foreign Application Priority Data

Jun. 11, 2010 (JP) ................. 2010-134512

(51) Int. Cl.
| | |
|---|---|
| F01N 3/00 | (2006.01) |
| F01N 3/025 | (2006.01) |
| F01N 3/36 | (2006.01) |
| F01N 9/00 | (2006.01) |
| F02B 37/013 | (2006.01) |
| F02M 63/02 | (2006.01) |

(52) U.S. Cl.
CPC ............ *F01N 3/0253* (2013.01); *F01N 3/36* (2013.01); *F01N 9/002* (2013.01); *F01N 2610/03* (2013.01); *F01N 2900/0412* (2013.01); *F01N 2900/08* (2013.01); *F01N 2900/1808* (2013.01); *F02B 37/013* (2013.01); *F02M 63/0225* (2013.01); *Y02T 10/47* (2013.01)
USPC .............................................. 60/286; 60/317

(58) Field of Classification Search
USPC ................................... 60/286, 317
See application file for complete search history.

(56) References Cited

U.S. PATENT DOCUMENTS

2004/0255574 A1* 12/2004 Tamura ........................... 60/276
2008/0092524 A1*  4/2008 Yokoyama et al. ............. 60/277
(Continued)

FOREIGN PATENT DOCUMENTS

| JP | 2002-180817 | 6/2002 |
| JP | 2003-184536 | 7/2003 |

(Continued)

OTHER PUBLICATIONS

English translation of Japanese Patent Application Publication No. JP 2003-184536A.*

(Continued)

*Primary Examiner* — Thomas Denion
*Assistant Examiner* — Jason Shanske
(74) *Attorney, Agent, or Firm* — Staas & Halsey LLP

(57) ABSTRACT

An exhaust pipe injection control device for controlling an appropriate fuel injection amount regardless of engine rotation speed. The exhaust pipe injection control device includes: a target injection amount setting unit which sets, according to an engine rotation speed and an exhaust gas flow rate, a target injection amount that is injected in a single injection from an exhaust pipe injector; a base pulse width ("BPW") map in which a fuel injection time of the exhaust pipe injector is set so that, with respect to the target injection amount and an exhaust pipe injection fuel pressure, fuel in the target injection amount is injected; and an exhaust pipe injection executing unit which performs injection from the exhaust pipe injector by referring to the BPW map based on the target injection amount and the exhaust pipe injection fuel pressure.

3 Claims, 3 Drawing Sheets

(56) References Cited

U.S. PATENT DOCUMENTS

| | | | |
|---|---|---|---|
| 2008/0151964 A1* | 6/2008 | Hagen et al. | 374/152 |
| 2009/0038290 A1 | 2/2009 | Tahara | |
| 2010/0108045 A1* | 5/2010 | Enomoto et al. | 123/674 |

FOREIGN PATENT DOCUMENTS

| | | |
|---|---|---|
| JP | 2005-61340 | 3/2005 |
| JP | 2005-307769 | 11/2005 |
| JP | 2010-106691 | 5/2010 |
| WO | WO 2007/026901 | 3/2007 |

OTHER PUBLICATIONS

English translation of Japanese Patent Application Publication No. JP 2005-61340A.*

English translation of Japanese Patent Application Publication No. JP 2002-180817A.*

Written Opinion of the International Searching Authority mailed Sep. 13, 2011 in corresponding International Application No. PCT/JP2011/063321.

Patent Abstracts of Japan, Publication No. 2002-180817, Published Jun. 26, 2002.

Patent Abstracts of Japan, Publication No. 2003-184536, Published Jul. 3, 2003.

Patent Abstracts of Japan, Publication No. 2005-061340, Published Mar. 10, 2005.

Patent Abstracts of Japan, Publication No. 2005-307769, Published Nov. 4, 2005.

Patent Abstracts of Japan, Publication No. 2010-106691, Published May 13, 2010.

International Search Report of PCT/JP2011/063321 mailed Sep. 13, 2011.

* cited by examiner

EXHAUST PIPE INJECTION CONTROL DEVICE

CROSS-REFERENCE TO RELATED APPLICATIONS

This application claims the foreign priority benefit of Japanese Application No. 2010-134512 filed Jun. 11, 2010, the contents of which are incorporated herein by reference, which serves as priority for PCT Application No. JP2011/063321 filed Jun. 10, 2011.

TECHNICAL FIELD

The present invention relates to an exhaust pipe injection control device that injects fuel for diesel particulate filter ("DPF") regeneration into an exhaust pipe and, in particular, to an exhaust pipe injection control device capable of controlling an appropriate fuel injection amount regardless of engine rotation speed.

BACKGROUND ART

In a diesel engine, an exhaust pipe is provided with a DPF in order to remove particulate matter (hereinafter referred to as PM) from exhaust gas from the diesel engine to purify the exhaust gas. A DPF is designed to collect PM in a honeycomb structure constituted by a porous ceramic. While excessive accumulation of collected PM impedes circulation of exhaust gas, the PM accumulated in the DPF can be removed through incineration by raising exhaust gas temperature. This is known as DPF regeneration.

Conventionally, in multistage injection in which an oxidation catalyst (hereinafter referred to as a DOC) made of platinum or the like is installed upstream of the DPF and fuel injection is performed in multiple stages in order to obtain engine thrust, methods of raising exhaust gas temperature to a level where PM can be incinerated include a method involving raising exhaust gas temperature to DOC activation temperature by increasing a fuel injection amount, performing fuel injection for DPF regeneration (post-injection) at an appropriate subsequent crank angle, supplying hydrocarbon (hereinafter referred to as HC) to the DOC by the post-injection, and raising the exhaust gas temperature using heat produced by oxidation of the HC. However, performing post-injection causes oil dilution in which the injected fuel becomes mixed into an engine lubricant and dilutes the lubricant. In addition, mixing of unburnt fuel of the post-injection into exhaust gas recirculation (hereinafter referred to as EGR) causes a decline in performance of an EGR cooler or a failure of a piston ring.

In consideration of the above, recently, a method is being evaluated in which exhaust pipe injection for injecting fuel into an exhaust pipe is performed in order to supply HC to a DOC and exhaust gas temperature is raised using heat produced by oxidation of the HC.

PRIOR ART DOCUMENTS

Patent Document 1: Japanese Patent Application Publication No. 2010-106691

With exhaust pipe injection, unlike post-injection in which fuel is injected into a cylinder, an injection timing can be decided independent of a crank angle and, at the same time the fuel injection amount can be arbitrarily decided. However, since exhaust pipe injection is a novel technique, a considerably large amount of time must be devoted to experiments in order to find an injection timing and a fuel injection amount which enable exhaust gas temperature to be raised effectively without wasting fuel. In contrast, a post-injection technique is already well-established through many experiments and an appropriate injection timing and fuel injection amount have been mapped. In consideration thereof, the present inventors considered setting a target of fuel injection amount in exhaust pipe injection based on a target injection amount in post-injection. A map of a target injection amount in exhaust pipe injection is set such that fuel equivalent to a fuel injection amount which is injected by post-injection at each cylinder in one combustion cycle of an engine is injected by an exhaust pipe injection in a predetermined period of time corresponding to one combustion cycle. By converting an injection timing and a target injection amount of already-established post-injection for use in exhaust pipe injection, the amount of time spent on experiments can be reduced compared to a so-called zero-based start.

However, with fuel injection in an engine, high-pressure fuel is stored in a common rail and fuel injection is performed as the high-pressure fuel is distributed to an injector of each cylinder from the common rail. The injector has a valving element that is driven by an electromagnetic force of a coil and is configured so as to be able to control the fuel injection amount by controlling a fuel injection time according to a duration (hereinafter, referred to as an energizing time) of a pulse current applied to the coil.

In contrast, an injector (exhaust pipe injector) used in exhaust pipe injection cannot receive a distribution of the high-pressure fuel from the common rail. Accordingly, fuel is supplied to the exhaust pipe injector from a supply source other than the common rail. Specifically, a feed pump is used. The feed pump is coupled to a crankshaft and is rotated so as to accompany the engine, and supplies fuel with a pump-out force corresponding to the engine rotation speed.

As described above, while fuel is to be supplied to the exhaust pipe injector from the feed pump, a fuel pressure of the feed pump is not constant and depends on engine rotation speed. Therefore, the fuel injection amount cannot be controlled based on energizing time (=fuel injection time) alone. A comparison between an injection for a given energizing time when the engine rotation speed is low and an injection for the same energizing time when the engine rotation speed is high shows that when the engine rotation speed is high, fuel injection amount increases due to higher fuel pressure of the feed pump. This means that simply setting an energizing time that is proportional to a target injection amount does not enable injection in the target injection amount.

SUMMARY OF THE INVENTION

Objects of the present invention are to solve the problems described above by providing an exhaust pipe injection control device capable of controlling an appropriate fuel injection amount regardless of engine rotation speed.

In order to achieve the objects described above, the present invention includes: a diesel particulate filter which is installed in an exhaust pipe of an engine and which collects particulate matter; an exhaust pipe injector which is installed upstream of the diesel particulate filter and which injects fuel into the exhaust pipe; a feed pump which supplies fuel to the exhaust pipe injector; a target injection amount setting unit which sets, according to an engine rotation speed and an exhaust gas flow rate, a target injection amount that is injected in a single injection from the exhaust pipe injector; an injection time map in which a fuel injection time of the exhaust pipe injector is set so that, with respect to the target injection amount and an exhaust pipe injection fuel pressure that is a pressure of fuel that acts on the exhaust pipe injector, fuel in the target injection amount is injected; and an exhaust pipe injection executing unit which performs injection from the exhaust pipe injector by referring to the injection time map based on the target injection amount and the exhaust pipe injection fuel pressure.

The feed pump may be rotated so as to accompany the engine and supply fuel to the exhaust pipe injector with a pump-out force corresponding to the engine rotation speed, and an exhaust pipe injection fuel pressure sensor that detects an exhaust pipe injection fuel pressure may be provided between the feed pump and the exhaust pipe injector.

An exhaust pipe injection fuel pressure map in which the exhaust pipe injection fuel pressure is set in advance with respect to an engine rotation speed and a virtual exhaust pipe injection fuel pressure detecting unit which refers to the exhaust pipe injection fuel pressure map based on the engine rotation speed may be further provided.

The present invention produces the superior effects below.

An appropriate fuel injection amount can be controlled regardless of engine rotation speed.

DETAILED DESCRIPTION

Hereinafter, embodiments of the present invention will be described in detail with reference to the accompanying drawings.

Figure 1:
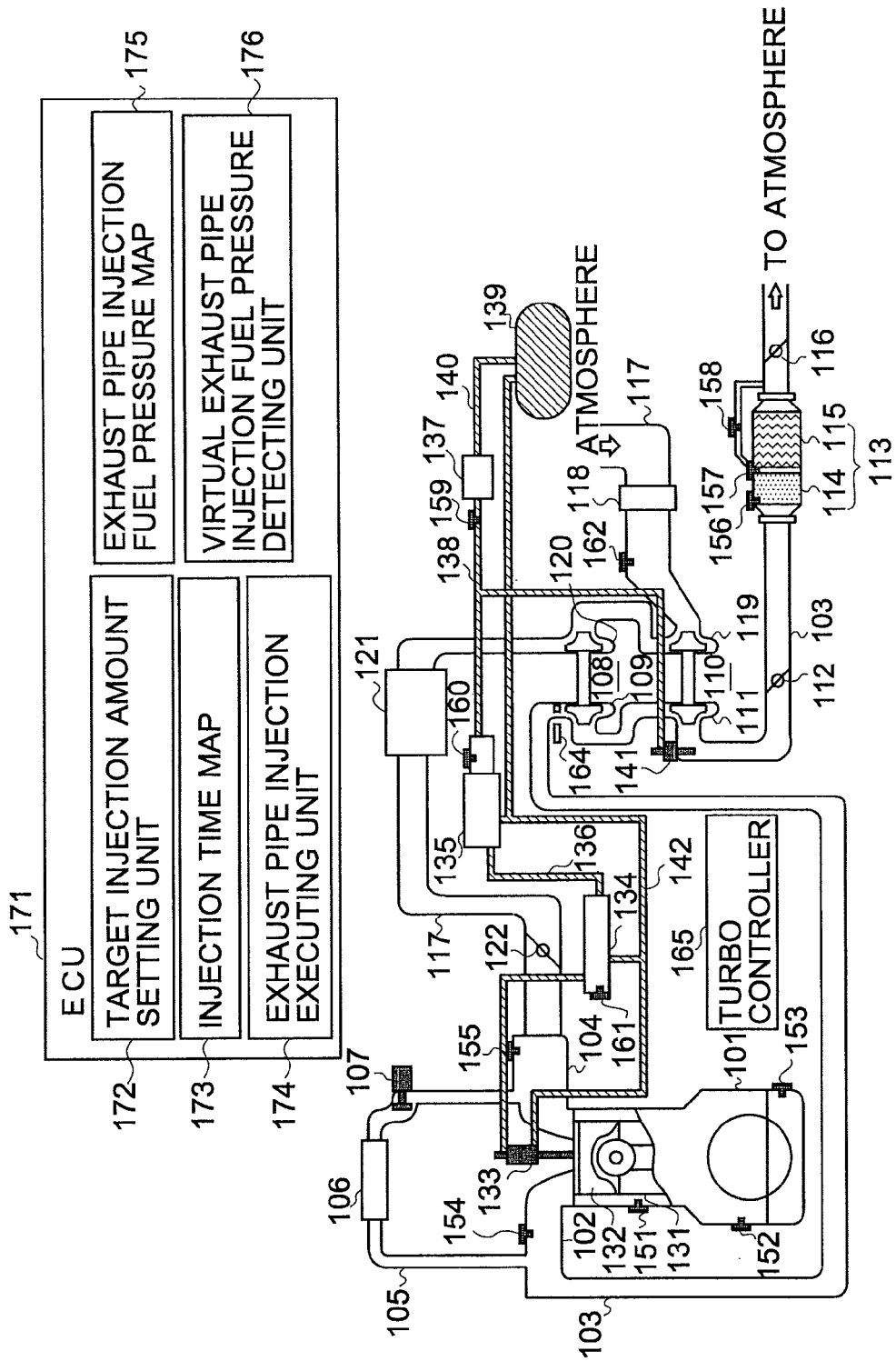
FIG. 1 is a system configuration diagram of an engine, an intake and exhaust system, and a fuel injection system of a vehicle to which the exhaust pipe injection control device according to the present invention is applied.

FIG. 1 shows a system configuration of an engine, an intake and exhaust system, and a fuel injection system of a vehicle to which the exhaust pipe injection control device according to the present invention is applied.

First, to describe a configuration of an exhaust system, an exhaust pipe 103 for discharging exhaust gas in an engine 101 to atmosphere is connected to an exhaust manifold 102 of the engine 101, and an EGR piping 105 for circulating exhaust gas from the exhaust manifold 102 to an intake manifold 104 is provided most upstream in the exhaust pipe 103. The EGR piping 105 is provided with an EGR cooler 106 for cooling exhaust gas and an EGR valve 107 for adjusting an EGR volume (or an EGR rate).

A turbine 109 of a high pressure stage turbocharger 108 is provided downstream of the exhaust pipe 103 and a turbine 111 of a low-pressure stage turbocharger 110 is provided further downstream. An exhaust brake valve 112 which closes the exhaust pipe 103 is provided downstream of the turbine 111 and a DPF unit 113 is provided further downstream. The DPF unit 113 is constituted by a DOC 114 which promotes oxidation of fuel injected into the exhaust pipe 103 during DPF regeneration and a DPF 115 which collects PM. An exhaust throttle 116 is provided downstream of the DPF unit 113 and the exhaust pipe 103 is opened to atmosphere downstream of the exhaust throttle 116. Moreover, although not shown, the exhaust pipe 103 may be provided with an SCR (selective catalytic reduction) device.

Next, to describe a configuration of an intake system, an intake pipe 117 for taking air into the engine 101 from atmosphere is connected to the intake manifold 104. Most upstream of the intake pipe 117 is open to atmosphere, and an air cleaner 118 for removing foreign objects such as dust is provided downstream of the intake pipe 117. A compressor 119 of the low-pressure stage turbocharger 110 is provided downstream of the air cleaner 118 and a compressor 120 of the high-pressure stage turbocharger 108 is provided further downstream. An intercooler 121 for cooling intake air compressed by the low-pressure stage turbocharger 110 and the high-pressure stage turbocharger 108 is provided downstream of the compressor 120, and an intake throttle 122 for limiting intake volume is provided further downstream. The intake pipe 117 is connected downstream of the intake throttle 122 to the intake manifold 104.

Next, to describe a configuration of a fuel injection system, the fuel injection system is configured so that a piston head 132 performs a reciprocating motion inside a cylinder 131 shown by a partial fracture cross-section of the engine 101. An injector 133 for injecting fuel is attached to the cylinder 131 and an injection port of the injector 133 is arranged at a position above a top dead center position of the piston head 132. While a simple diagram is shown, the engine 101 includes a plurality of cylinders 131 and each cylinder 131 is provided with the injector 133. Each injector 133 is supplied with high-pressure fuel from a common rail 134. Although details will not be shown, the injector 133 has a valving element that is driven by an electromagnetic force of a coil, and the injection port is opened according to a duration (energizing time) of a pulse current applied to the coil.

A high-pressure fuel pipe 136 which supplies fuel at a high-pressure (common rail fuel pressure) from a high-pressure pump 135 is connected to the common rail 134. An intermediate-pressure fuel pipe 138 which supplies fuel from a feed pump 137 at an intermediate pressure (exhaust pipe injection fuel pressure) that is lower than the common rail fuel pressure and higher than atmospheric pressure is connected to the high-pressure pump 135. The feed pump 137 is adapted to take in fuel from a fuel tank 139 at atmospheric pressure via a low-pressure fuel pipe 140. The feed pump 137 is coupled to a crankshaft (not shown) and is rotated so as to accompany the engine 101, and by pumping out fuel with a pump-out force corresponding to the engine rotation speed, the feed pump 137 is able to supply fuel at an exhaust pipe injection fuel pressure corresponding to the engine rotation speed to the intermediate-pressure fuel pipe 138.

In the present invention, an exhaust pipe injector 141 for injecting fuel into the exhaust pipe 103 is provided downstream of the turbine 111 of the low-pressure stage turbocharger 110 and upstream of the exhaust brake valve 112. The exhaust pipe injector 141 is adapted so that fuel is supplied to the exhaust pipe injector 141 from the feed pump 137 via the intermediate-pressure fuel pipe 138.

A recovered fuel pipe 142 which recovers surplus fuel to the fuel tank 139 is respectively connected to the high-pressure pump 135, the common rail 134, and the injector 133.

Next, sensors will be described.

The engine 101 is provided with a water temperature sensor 151 which detects cooling water temperature, a crank angle sensor 152 which detects an index on the crankshaft (not shown) as a crank angle reference position, an oil level sensor 153 which detects a remaining level of engine oil, and the like. An engine exhaust temperature sensor 154 is provided on the exhaust manifold 102. A boost pressure sensor 155 is provided on the intake manifold 104.

The DPF unit 113 is provided with a DOC entrance exhaust gas temperature sensor 156 which detects exhaust gas temperature at an entrance of the DOC 114, a DPF entrance exhaust gas temperature sensor 157 which detects exhaust gas temperature at an entrance of the DPF 115, and a differential pressure sensor 158 which detects a differential pressure that is a difference in exhaust gas pressure between the entrance and an exit of the DPF 115. As PM accumulates in the DPF 115, the differential pressure increases with an increase in accumulation. Therefore, a timing of DPF regeneration can be judged based on the differential pressure. A temperature of the DPF 115 during DPF regeneration and the like can be checked by a DPF entrance exhaust gas temperature detected by the DPF entrance exhaust gas temperature sensor 157.

The intermediate-pressure fuel pipe 138 is provided with an exhaust pipe injection fuel pressure sensor 159 which detects an exhaust pipe injection fuel pressure that is fuel pressure that acts on the exhaust pipe injector 141. A fuel temperature sensor 160 which detects fuel temperature is provided at an entrance of the high-pressure pump 135. The common rail 134 is provided with a common rail fuel pressure sensor 161 which detects a common rail fuel pressure that is fuel pressure that acts on the injector 133 of each cylinder 131. A mass air flow sensor (MAF sensor) 162 which detects a flow of air taken in by the intake pipe 117 is provided downstream of the air cleaner 118 of the intake pipe 117.

It is assumed that the engine 101, the intake and exhaust system, and the fuel injection system are provided with every conventionally-known sensor in addition to those illustrated and described.

Next, a configuration of a control system will be described.

The high-pressure stage turbocharger 108 is a variable nozzle turbocharger. A nozzle actuator 164 which adjusts an opening area of the turbine 109 is provided upstream of the turbine 109. A turbo controller 165 controls a supercharging volume or a supercharging pressure while referring to a boost pressure detected by the boost pressure sensor 155 and driving the nozzle actuator 164.

Control for respective sections of a vehicle including fuel injection to the engine 101 is built into an electronic control unit (ECU) 171 in the form of a program. The ECU 171 is adapted to control fuel injection and the like by constantly detecting engine rotation speed, accelerator position, load torque, air volume, and the like as engine parameters which indicate engine condition. In order to obtain thrust of the engine 101, the ECU 171 is adapted to execute multistage injection control in which fuel injection is performed a plurality of times from the injector 133 at an appropriate crank angle within one combustion cycle of each cylinder 131.

Exhaust pipe injection according to the present invention is controlled by the ECU 171. Specifically, the ECU 171 is provided with: a target injection amount setting unit 172 which sets, according to an engine rotation speed and an exhaust gas flow rate, a target injection amount that is injected in a single injection from the exhaust pipe injector 141; an injection time (in this case, referred to as a BPW (Base Pulse Width) since control is performed based on energizing time) map 173 in which a fuel injection time of the exhaust pipe injector 141 is set so that, with respect to a target injection amount and an exhaust pipe injection fuel pressure, fuel in the target injection amount is injected; and an exhaust pipe injection executing unit 174 which performs injection from the exhaust pipe injector 141 by referring to the BPW map 173 based on a target injection amount and an exhaust pipe injection fuel pressure. The ECU 171 is further provided with an exhaust pipe injection fuel pressure map 175 in which an exhaust pipe injection fuel pressure is set in advance with respect to an engine rotation speed and a virtual exhaust pipe injection fuel pressure detecting unit 176 which refers to the exhaust pipe injection fuel pressure map 175 based on an engine rotation speed.

The ECU 171 is adapted to perform DPF regeneration each time a travel distance of the vehicle reaches a predetermined distance and, at the same time, to perform DPF regeneration when a differential pressure detected by the differential pressure sensor 158 equals or exceeds a predetermined value.

Figure 2:
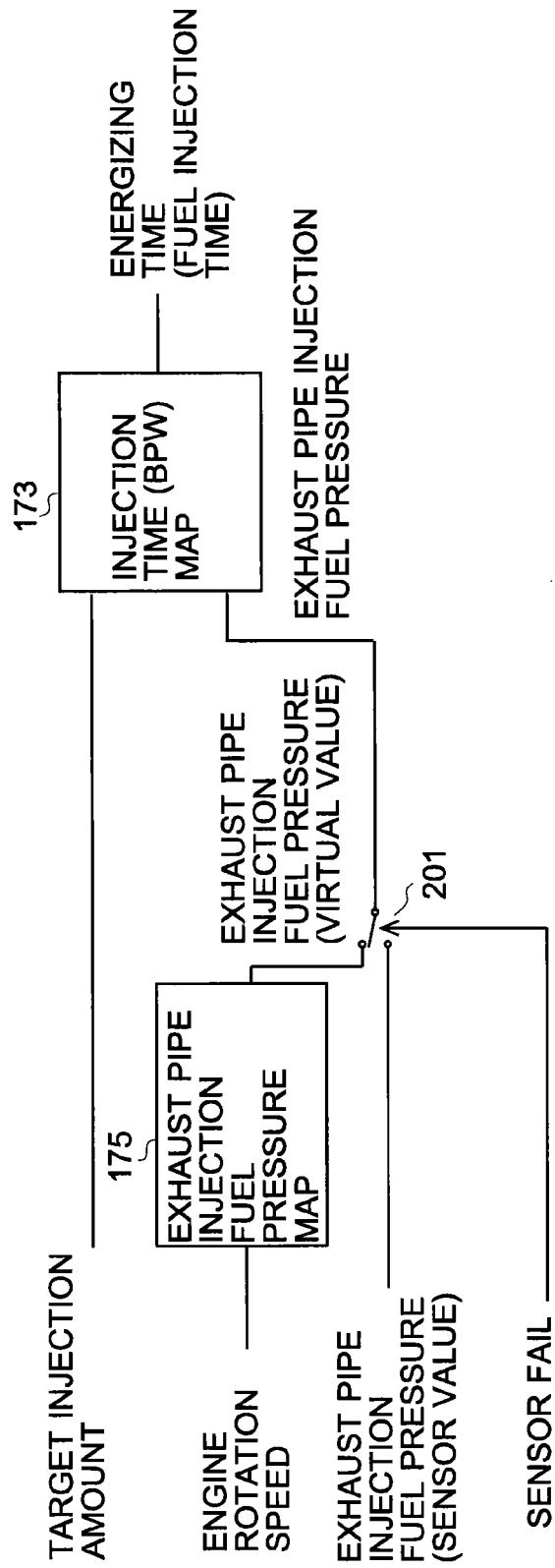
FIG. 2 is a diagram providing a circuit image representation of a procedure for deciding a fuel injection time of an exhaust pipe injector according to the present invention.

As shown in FIG. 2, when a procedure for deciding an energizing time that becomes a fuel injection time of the exhaust pipe injector 141 in the ECU 171 is represented by a circuit image, an engine rotation speed is inputted to the exhaust pipe injection fuel pressure map 175 and an exhaust pipe injection fuel pressure (virtual value) that is an output of the exhaust pipe injection fuel pressure map 175 is inputted to one input terminal of a switch 201. Meanwhile, an exhaust pipe injection fuel pressure (sensor value) from the exhaust pipe injection fuel pressure sensor 159 is inputted to another input terminal of the switch 201. A sensor fail signal indicating that a failure has occurred at the exhaust pipe injection fuel pressure sensor 159 is inputted to a control terminal of the switch 201. The BPW map 173 is adapted to receive input of an exhaust pipe injection fuel pressure that is an output of the switch 201 and a target injection amount and to output an energizing time.

Figure 3:
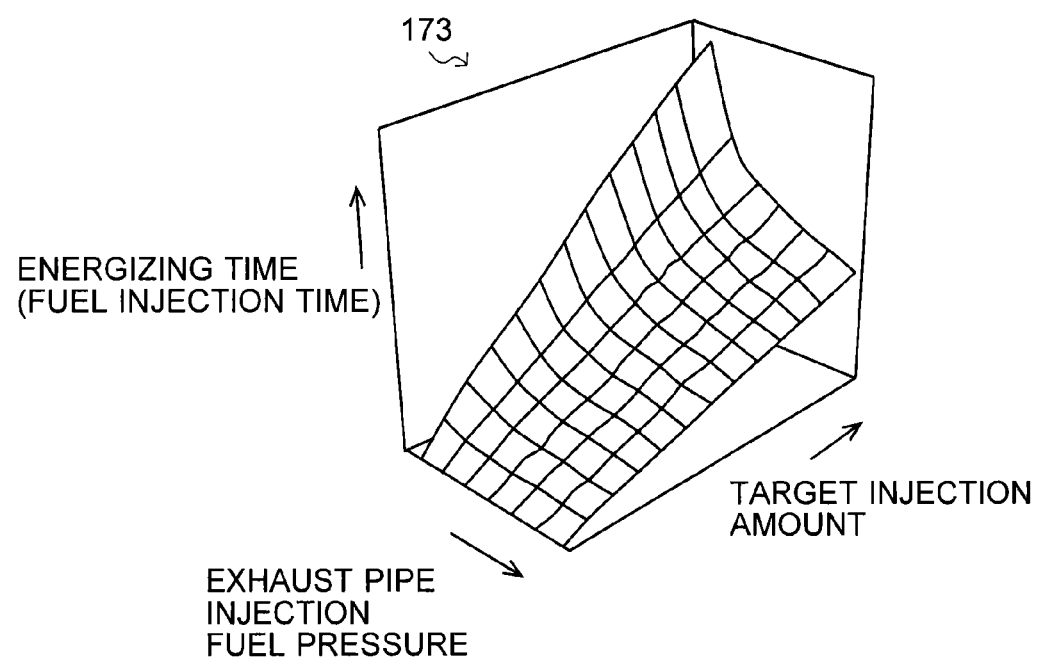
FIG. 3 is a three-dimensional graph of a Base Pulse Width ("BPW") map used in the present invention.

As shown in FIG. 3, the BPW map 173 may be imaged by a three-dimensional graph of target injection amount, exhaust pipe injection fuel pressure, and energizing time (fuel injection time). Energizing time is approximately proportional to target injection amount and the greater the target injection amount, the longer the energizing time. On the other hand, energizing time is approximately inversely proportional to exhaust pipe injection fuel pressure, and the energizing time is longer when the exhaust pipe injection fuel pressure is lower and the energizing time is shorter when the exhaust pipe injection fuel pressure is higher.

Hereinafter, operations of the exhaust pipe injection control device according to the present invention will be described.

In order to raise exhaust gas temperature to a desired temperature during DPF regeneration, the target injection amount setting unit 172 shown in FIG. 1 sets a target injection amount that is injected by a single injection from the exhaust pipe injector 141 according to an engine rotation speed and an exhaust gas flow rate. The exhaust pipe injection executing unit 174 refers to the BPW map 173 based on a target injection amount and an exhaust pipe injection fuel pressure and performs injection from the exhaust pipe injector 141. Energizing time (fuel injection time) is set in the BPW map 173 as shown in FIG. 3, and an energizing time at coordinates of an intersection between a target injection amount and an exhaust pipe injection fuel pressure in the BPW map 173 is read. Therefore, for example, when the engine rotation speed is low, a long energizing time is outputted for a same target injection amount due to a low exhaust pipe injection fuel pressure. As a result, since a current is applied to the exhaust pipe injector 141 over a longer period of time and the fuel injection time becomes longer, fuel in the target injection amount is injected even if the exhaust pipe injection fuel pressure is low. When the engine rotation speed is high, a short energizing time is outputted for a same target injection amount due to a high exhaust pipe injection fuel pressure. As a result, since a current is applied to the exhaust pipe injector 141 over a shorter period of time and the fuel injection time is shorter, fuel in the target injection amount is injected even if the exhaust pipe injection fuel pressure is high.

The exhaust pipe injection fuel pressure is detected by the exhaust pipe injection fuel pressure sensor 159 and, at the same time, obtained by the virtual exhaust pipe injection fuel pressure detecting unit 176 by referring to the exhaust pipe injection fuel pressure map 175 based on an engine rotation speed. When the exhaust pipe injection fuel pressure sensor 159 is normal, a sensor value that is an output of the exhaust pipe injection fuel pressure sensor 159 is provided to the exhaust pipe injection executing unit 174, and upon a sensor fail where a failure has occurred at the exhaust pipe injection fuel pressure sensor 159, a virtual value that is an output of the virtual exhaust pipe injection fuel pressure detecting unit 176 is provided to the exhaust pipe injection executing unit 174.

The virtual value of the virtual exhaust pipe injection fuel pressure detecting unit 176 can always be used irrespective of a sensor fail. Therefore, by performing exhaust pipe injection using the virtual value, a situation can be avoided where exhaust pipe injection can no longer be performed due to a sensor fail, which makes DPF regeneration impossible and prevents the vehicle from running.

Meanwhile, the exhaust pipe injection fuel pressure sensor 159 can accommodate variations in performances among different vehicles and changes over time. In other words, since the exhaust pipe injection fuel pressure map 175 is uniformly set regardless of vehicle, a virtual value obtained from the exhaust pipe injection fuel pressure map 175 does not accommodate variations in performances and changes over time of the fuel injection system including the feed pump 137. A sensor value of the exhaust pipe injection fuel pressure sensor 159 represents fuel pressure that actually acts on the exhaust pipe injector 141 and therefore contributes to obtaining a more accurate energizing time.

As described above, with the exhaust pipe injection control device according to the present invention, since the exhaust pipe injection control device has the BPW map 173 in which a fuel injection time of the exhaust pipe injector 141 is set so that, with respect to a target injection amount and an exhaust pipe injection fuel pressure, fuel in the target injection amount is injected, and the exhaust pipe injection executing unit 174 which performs injection from the exhaust pipe injector 141 by referring to the BPW map 173 based on a target injection amount and an exhaust pipe injection fuel pressure, fuel is injected from the exhaust pipe injector 141 in the target injection amount even if exhaust pipe injection fuel pressure varies due to engine rotation speed.

With the exhaust pipe injection control device according to the present invention, since the exhaust pipe injection control device has the exhaust pipe injection fuel pressure sensor 159, a fuel pressure that actually acts on the exhaust pipe injector 141 can be detected and a more accurate fuel injection time can be obtained.

With the exhaust pipe injection control device according to the present invention, since the exhaust pipe injection control device has the exhaust pipe injection fuel pressure map 175 in which an exhaust pipe injection fuel pressure is set with respect to engine rotation speed and the virtual exhaust pipe injection fuel pressure detecting unit 176 which refers to the exhaust pipe injection fuel pressure map 175 based on an engine rotation speed, an exhaust pipe injection fuel pressure can always be obtained irrespective of a sensor fail and a situation where performing DPF regeneration becomes impossible can be avoided. Furthermore, inexpensive vehicle types not equipped with the exhaust pipe injection fuel pressure sensor 159 can be provided.

The invention claimed is:

1. An exhaust pipe injection control device comprising:
   a diesel particulate filter which is installed in an exhaust pipe of an engine and which collects particulate matter;
   an exhaust pipe injector which is installed upstream of the diesel particulate filter and which injects fuel into the exhaust pipe;
   a feed pump which supplies fuel to the exhaust pipe injector;
   a controller which sets, according to an engine rotation speed and an exhaust gas flow rate, a target injection amount that is injected in a single injection from the exhaust pipe injector; and
   an injection time map in which a fuel injection time of the exhaust pipe injector is set so that, with respect to the target injection amount and an exhaust pipe injection fuel pressure that is a pressure of fuel that acts on the exhaust pipe injector, fuel in the target injection amount is injected;
   wherein the controller performs injection from the exhaust pipe injector by referring to the injection time map based on the target injection amount and the exhaust pipe injection fuel pressure,
   wherein the fuel injection time of the injection time map is set longer when the target injection amount is greater, and is set shorter when the exhaust pipe injection fuel pressure is higher.

2. The exhaust pipe injection control device according to claim 1, wherein
   the feed pump supplies fuel to the exhaust pipe injector based on the engine rotation speed, and
   an exhaust pipe injection fuel pressure sensor detects an exhaust pipe injection fuel pressure and is provided between the feed pump and the exhaust pipe injector.

3. The exhaust pipe injection control device according to claim 1, further comprising:
   an exhaust pipe injection fuel pressure map in which the exhaust pipe injection fuel pressure is set in advance with respect to the engine rotation speed; and
   a virtual exhaust pipe injection fuel pressure detector which refers to the exhaust pipe injection fuel pressure map based on the engine rotation speed.

* * * * *